United States Patent [19]

Barry et al.

[11] Patent Number: 4,925,694
[45] Date of Patent: May 15, 1990

[54] METHOD FOR PRODUCING HIGH SOLIDS FILLING MATERIAL

[75] Inventors: David L. Barry, Lewisville; Mark L. Dreher, Highland Village; Alan A. Johnson, Irving; Otto E. Schroeder, Dallas, all of Tex.

[73] Assignee: Frito-Lay, Inc., Dallas, Tex.

[21] Appl. No.: 289,314

[22] Filed: Dec. 23, 1988

Related U.S. Application Data

[62] Division of Ser. No. 911,358, Sep. 25, 1986, Pat. No. 4,824,684.

[51] Int. Cl.$^5$ .............................................. A23G 3/00
[52] U.S. Cl. .................................... 426/613; 426/518; 426/659; 426/660
[58] Field of Search ................. 426/613, 94, 556, 518, 426/572, 659, 660

[56] References Cited

U.S. PATENT DOCUMENTS

| | | | |
|---|---|---|---|
| 2,015,257 | 12/1935 | Clickner | 426/93 |
| 2,168,360 | 8/1939 | Musher | 426/589 |
| 3,582,362 | 6/1971 | Drews et al. | 426/613 |
| 4,162,333 | 7/1979 | Nelson et al. | 426/283 |
| 4,296,141 | 10/1981 | de Paolis | 426/613 |
| 4,439,461 | 3/1984 | Czyzewski et al. | 426/601 |
| 4,613,509 | 12/1986 | Ward et al. | 426/283 |

*Primary Examiner*—Donald E. Czaja
*Assistant Examiner*—Celine T. Callahan
*Attorney, Agent, or Firm*—Bernard, Rothwell & Brown

[57] ABSTRACT

Pumpable, edible fillings are produced from vegetable shortening having a Wiley melt point from 90° F. to 120° F. and a solid fat index from 1% to 6% at 92° F. and at 100° F., a solids extender, and solid flavoring materials by a method which carefully controls the crystal structure of the vegetable shortening and the particle size of the solid flavoring material.

11 Claims, 1 Drawing Sheet

METHOD FOR PRODUCING HIGH SOLIDS FILLING MATERIAL

This is a division of application Ser. No. 06/911,358 filed Sep. 25, 1986.

BACKGROUND OF THE INVENTION

1. Field of the Invention

This invention relates to the preparation of pumpable edible filling compositions which are suitable for use in comestible products having an outer shell of cooked dough. In particular, the invention relates to the production of fat-based filling compositions which have high solids contents and which are relatively inexpensive to produce.

2. Description of the Background

Center-filled food products are available in great variety and are very popular food items. Such products include, for example, filled pastries, candies and snack items. The filling compositions of this invention are particularly suited for use in filled products which can be described generally as having an outer shell of cooked dough with a central cavity that contains a filling.

U.S. Pat. No. 4,613,509 entitled, "Process for Producing Center-Filled Food Products", describes the production of a baked product suitable for receiving the filling composition of this invention. A hollow cylindrical shell of farinaceous material having a single longitudinal slit is extruded and baked to produce a generally C-shaped cross-section suitable for receiving a filling material. After baking, a filling material is continuously pumped into the cavity of the shell through the slit in the outer wall to produce a composite product.

U.S. Pat. No 4,162,333 entitled, "Method and Apparatus for Making Filled Food Product", describes the production of a similar center-filled farinaceous product, except that the outer, farinaceous shell is in a form having a closed annular cross-section, i.e., a tubular outer shell.

Filling materials generally can be water-based or fat-based. For use in composite products of the type described in U.S. Pat. Nos. 4,613,509 and 4,162,333, water-based fillings are problematic since they tend to transmit water into the farinaceous shell, thereby making it soggy and reducing its shelf life. Consequently, the fillings which have been employed in these types of products have usually been fat-based, e.g., based on vegetable shortening. A typical filling material which has been employed in products of the type described in the aforementioned products comprises a solid flavoring material in powder or fine particulate form, such as nacho cheese powder, together with a solids extender, dispersed in a vegetable shortening base. It is desirable in such fillings to have a high solids content, particularly a high content of the extender, in order to reduce costs and to reduce caloric and fat intake.

Unfortunately, problems have been encountered with the fat-based filling materials heretofore employed. At the solids levels that yield desirable texture and flavor characteristics, the fillings tend to form lumps during processing that clog filling nozzles. This is a particular problem when filling the C-shaped outer shell described in U.S. Pat. No. 4,613,509 because the filling typically must be pumped through an opening in the product which is less than 0.100 in. wide.

The flow properties of the filling can be improved by using slightly lower-melting point vegetable shortenings or by reducing solids content, both of which have undesirable effects. Use of lower-melting point vegetable shortenings can result in leakage of the filling at elevated temperature, especially during shipping and storage in the summer months.

What is needed is a fat-based, high solids content filling having improved shear and temperature stability properties.

SUMMARY OF THE INVENTION

This invention provides compositions and methods for producing fat-based fillings which are pumpable and which have high solids contents. As used herein, the phrase "high solids content" refers to filling compositions having at least 40 weight percent solids therein. The filling compositions of the invention have a smooth, uniform consistency so that they can be pumped through nozzle openings as small as 0.080 in. in width without blockage. The fillings resist leakage at storage temperatures up to about 140° F. They are economical to produce, inasmuch as they can employ a relatively high ratio of solids extender to flavoring material without loss of flavor.

In accordance with the teachings of the invention, there is provided a pumpable, edible filling composition comprising:

(a) from about 40% to about 60% by weight vegetable shortening having a Wiley melt point from about 90° F. to about 120° F. and a solid fat index from about 1% to about 6% at 92° F. and at 100° F.;

(b) from about 10% to about 40% by weight of a solids extender; and (c) from about 1% to about 50% by weight of a solid flavoring material, said solids extender and flavoring material having a particle size from about 20 microns to about 100 microns, and being uniformly dispersed throughout the vegetable shortening. A particularly preferred solids extender is whey solids.

There is also provided a method for producing a pumpable, edible filling composition. By using the specific vegetable shortening and extender of the invention and by carefully controlling the time-temperature profile of the material during the crystal-forming phase of the method, there is obtained a fat-based filling in which the fat contains a fine grain beta prime crystal structure. This crystal structure imparts highly desirable rheological properties to the filling. In particular, the filling flows smoothly and can be subjected to shear forces and relatively high temperatures without meltout or separation.

In accordance with the method of the invention, a pumpable, edible filling composition is produced by a process comprising:

(a) heating vegetable shortening to a temperature at least high enough to dissolve its crystal structure, said vegetable shortening having a Wiley melt point from about 90° F. to about 120° F. and a solid fat index from about 1% to about 6% at 92° F. and at 100° F.;

(b) dispersing a solids extender and a solid flavoring material in the heated vegetable shortening;

(c) cooling the dispersion to a temperature below the crystallization temperature of the vegetable shortening in a heat exchanger which effects cooling at a rate that is substantially uniform throughout the dispersion, and (d) reducing the particle size of the solids extender and solid flavoring material to a size of from about 20 microns to about 100 microns.

In a preferred embodiment of the invention, the heat exchanger which is used to crystallize the vegetable shortening is a scrape-surface heat exchanger There is also provided by the present invention a comestible product comprising an outer shell of a cooked farinaceous dough having an inner cavity which is filled with the filling material of the invention.

BRIEF DESCRIPTION OF THE DRAWING

The single Figure is a schematic representation of a preferred method of the invention for preparing a pumpable, edible filling material.

DETAILED DESCRIPTION OF THE PREFERRED EMBODIMENTS

Figure 1:
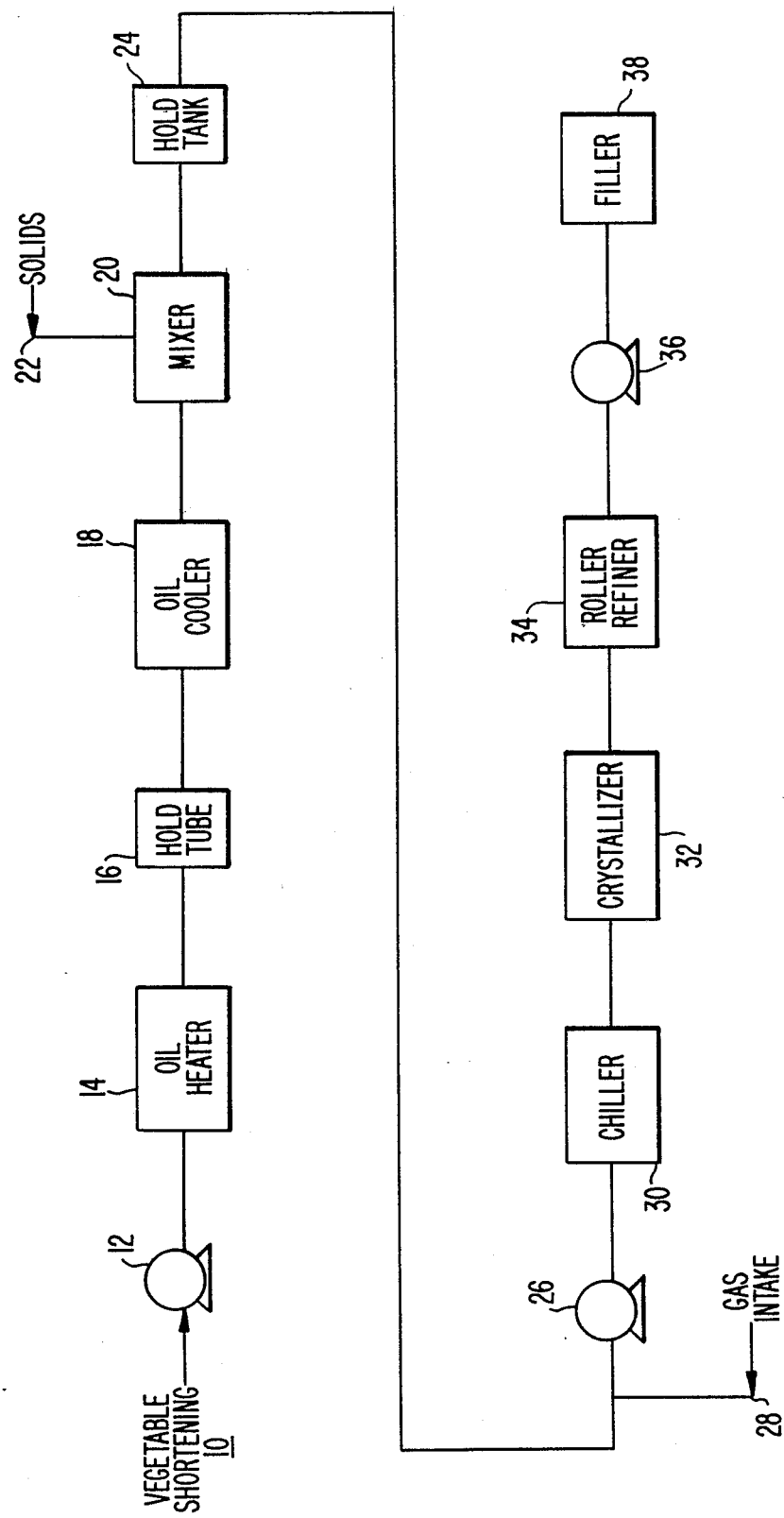

The pumpable, edible filling composition of the invention contains a vegetable shortening having a Wiley melt point from about 90° F. to about 120° F. and a solid fat index from about 1% to about 6% at 92° F. and at 100° F.

As those skilled in the art are aware, vegetable shortenings are triglycerides, which are usually partially hydrogenated, derived from vegetable sources. Suitable vegetable shortenings for use in the composition of the invention include, for example, partially hydrogenated soybean, corn, peanut, coconut, palm, cottonseed and sunflower oils.

Commercial suppliers of fats and oils can generally tailor the properties of vegetable shortenings to provide the desired Wiley melt point and solid fat index Wiley melt point is determined by American Oil Chemists Society (A.O.C.S.) Official Method Ce 2-38. The solid fat index represents the volume percentage of the fat that is in solid form at a given temperature, as determined by A.O.C.S. Official Method, Cd 10-57.

In order to completely characterize a particular fat, suppliers generally specify the solid fat index at 50° F., 70° F., 80° F., 92° F. and 100° F. For purposes of the present invention, it is necessary that the vegetable shortening have a solid fat index of from about 1% to about 6% at both 92° F. and 100° F. Preferably, the vegetable shortening has about the following solid fat index profile:

| | |
|---|---|
| 50° F. | 30% to 35% |
| 70° F. | 16% to 20% |
| 80° F. | 10% to 12% |
| 92° F. | 1% to 6% |
| 100° F. | 1% to 6% |

Vegetable shortenings satisfying the above criteria are commercially available. A particularly useful vegetable shortening is a partially hydrdogenated soybean oil having a Wiley melt point of 95°±2° F. and about the following solid fat index profile:

| | |
|---|---|
| 50° F. | 33.0% |
| 70° F. | 18.0% |
| 80° F. | 11.0% |
| 92° F. | 3.0% |
| 100° F. | 1.0% |

The vegetable shortening is present in the filling composition of the invention in an amount from about 40% to about 60%, based on the total weight of the filling; preferably from about 45% to about 50% thereof.

The solids extender can be selected from the known solids extenders which include maltodextrin, pregelatinized and other modified starches, cellulose powder and milled flour. The solids extender serves to adjust texture, supply body and replace more expensive solid flavoring materials.

The composition of the invention preferably employs whey solids as a solids extender. The use of whey solids as disclosed herein, reduces or eliminates nozzle clogging. As used herein, the term "whey solids" includes dry whey as well as modified forms of dry whey. As those skilled in the art are aware, whey is the liquid substance obtained by separating the coagulum from milk, cream or skim milk in cheese-making. When a significant amount of lactose is converted to lactic acid during the whey-making procedure or when the whey is obtained from curd formation by direct acidification of milk, the resultant product is known as acid whey. When there is insignificant conversion of the lactose to lactic acid in the whey-making procedure, the resultant product is known as sweet whey. It is preferred to employ sweet whey solids.

Dry whey is the product obtained by removing water from whey, leaving all of its other constituents in the same relative proportions as in whey. Various modified forms of dry whey are also known, such as reduced lactose whey and reduced minerals whey. All of these modified forms can be employed in the composition of the invention.

The whey solids or other extender are present in the filling composition of the invention in an amount from about 10% to about 40%, based on the total weight of the filling; preferably from about 10% to about 20% thereof.

The filling composition of the invention also contains a solid flavoring material. Any of the known commercially available solid flavoring materials can be employed. These are generally provided in the form of coarse powders or fine particles having particle sizes up to about 850 microns. One can mention, as merely exemplary of the solid flavoring materials which can be incorporated into the filling compositions of the invention, cheese powder, such as cheddar and nacho cheese powder; spice powders, such as onion, garlic and barbeque flavoring; confectionary powders, such as chocolate and caramel flavorings; peanut butter flavoring; savory flavorings; meat flavorings; dairy flavorings, such as buttermilk and yogurt; and citrus flavorings. The solid flavoring material is present in an amount from about 1% to about 50% by weight of the filling; preferably from about 15% to about 50% thereof It is essential to the practice of the invention that the solid flavoring material and solids extender be incorporated into the filling composition in the form of a powder having a particle size from about 20 microns to about 100 microns, preferably from about 40 microns to about 70 microns. This reduced particle size allows for the reduction of the amount of flavoring material and concomitant increase in the amount of extender, without loss of perceived flavor. It also contributes to the production of a pumpable filling having desirable rheological properties and high solids contents. The solid flavoring material and solids extender may be subjected to size reduction procedures, such as milling, to produce the desired particle size prior to introducing it into the vegetable shortening. However, this creates material handling and dusting problems. It is preferred to first incorporate the solid flavoring material and solids extender into the vegetable shortening and then to produce the desired particle size by subjecting the filling composition to a refining operation as described below in the preferred embodiment of the invention.

Controlling the temperature of the vegetable shortening during the production of the filling is critical to the obtainment of proper fat crystal formation, which results in desirable rheological properties. In the initial step of the method of the invention, the vegetable shortening is heated to a temperature at least high enough to dissolve its crystal structure completely. While this temperature may vary slightly depending on the particular vegetable shortening, it is generally preferred to heat the vegetable shortening to a temperature between about 140° F. and 150° F. to dissolve its crystal structure.

After the vegetable shortening has been heated to a temperature high enough to dissolve its crystal structure, its temperature is then adjusted to between about 110° F. and 120° F. Next, the solid constituents of the filling, the solids extender and flavoring materials, are thoroughly dispersed in the shortening, using well-known mixing means.

The dispersion is then cooled to a temperature below the crystallization point of the vegetable shortening to reform the fat crystals and solidify the dispersion. Generally, the dispersion is cooled to a temperature from about 50° F. to 70° F. The final cooling temperature may vary somewhat, depending on the melting characteristics of the particular vegetable shortening.

It is essential that cooling be effected at a rate which is substantially uniform throughout the entire mass of the dispersion in order to promote a uniform crystal structure. A preferred means for effecting uniform cooling is by using a scrape-surface heat exchanger. This type of heat exchanger is known and is commercially available. A suitable scrape-surface heat exchanger is commercially available under the trade designation Thermutator from the Cherry-Burrell Corp., Cedar Rapids, IA. A scrape-surface heat exchanger consists generally of a central longitudinal cavity of cylindrical configuration, having inlet and exit ports at opposite ends and being jacketed for the circulation of cooling medium. A rotor is disposed within the central cavity and is connected to a plurality of blades, the edges of which are disposed in close tolerance with the walls of the cavity. An external drive causes the rotor to turn so that the blades continuously scrape the cylinder walls and mix the dispersion within the heat exchanger as it is being pumped from the inlet end to the exit end.

In order to produce a fine crystal structure, it is preferred that the dispersion be cooled below its crystallization temperature in a rapid manner. Preferably, cooling is effected such that the crystallization temperature is achieved within about two minutes after cooling begins. This can be achieved easily by controlling the residence time in the cooling unit and by appropriate selection of a cooling medium.

After the dispersion has been cooled below the crystallization temperature of the vegetable shortening to form the desired crystal structure and solidify the vegetable shortening, the dispersion can be refined to reduce the solids extender and the solid flavoring material to the desired particle size.

The method of the invention can be further understood with reference to FIG. 1, which is a schematic representation of a preferred embodiment of the method of the invention, wherein the solids extender is whey solids.

Referring to FIG. 1, the vegetable shortening, which has been preheated to make it liquid, is introduced into the system at 10 from a suitable storage tank, not shown. A positive displacement pump 12 draws the shortening from the supply 10 and carries it to a heating unit 14, under pressure. The shortening is heated in the heating unit 14 and held in a hold tube 16 to assure that all shortening crystals have been eliminated. The shortening is then cooled in a cooling unit 18 to a temperature at which the shortening is still noncrystalline, and which temperature will not adversely affect the components of the flavoring material and the whey solids. Generally the shortening is cooled to a temperature between about 110° F. and 120° F. The cooled shortening is then carried to an in-line mixer 20 where the flavoring and whey solids 22 are added and homogeneously blended together. The solid flavoring and whey solids are accurately metered to the in-line mixer with either volumetric feeders or weigh feeders, not shown. This dispersion of solids and melted shortening is carried to a heated and agitated hold tank 24 where it is held for final processing. Alternatively, this shortening-/solids dispersion may be prepared as a batch in one or more heated/cooled, agitated tank(s). A positive displacement pump 26 draws the shortening/solids dispersion from the hold tank 24 and carries it to a scrape-surface heat exchanger 30 under pressure where the dispersion is quick-chilled and the shortening uniformly supercooled to establish a large number of crystal nucleation sites, after which the beta prime crystals are formed. A volume of gas for density control of the filling may be introduced through the gas intake 28 which may be regulated by a suitable flow indicator, not shown. The scrape-surface heat exchanger 30 employs a refrigerant such as Freon ® or ammonia as the cooling medium. The temperature of the shortening-/solids dispersion exiting the scrape-surface heat exchanger 30 is from about 50° F. to 70° F. Residence time in the scrape-surface heat exchanger 30 is preferably about 1.5 minutes.

The dispersion is then passed through a second scrape-surface heat exchanger 32, where the dispersion is continuously worked as crystallization of the fat proceeds. The second scrape-surface heat exchanger 32 may employ water as a heat exchange medium to remove the heat of crystallization The temperature of the dispersion exiting the second scrape-surface heat exchanger 32 is from about 70° F. to 90° F. The exit temperature must be kept sufficiently low to provide the desirable rheological properties of the dispersion for processing through the refiner 34. Residence time in the second scrape-surface heat exchanger 32 is preferably about 1.5 minutes.

From the second scrape-surface heat exchanger 32, the dispersion is carried to a roller refiner 34 where the solid particles are reduced to the desired size of 20–100 microns. The roller refiner 34 may be either a three, four, or five roll type similar to those used in the preparation of chocolates and compound coatings. The refiner means could also be other milling means such as a ball mill, which would be used prior to scrape-surface heat exchanger 30. A positive displacement pump 36 collects the output of the roller refiner 34 and carries the refined filling to a packaging machine or filler 38 where it is placed in suitable containers.

In accordance with the present invention, the dispersion leaving the heat exchanger 32 or the roller refiner 34 need not be "tempered." Tempering refers to the known processing of shortening wherein the fat is held at one or more controlled temperatures in sequence, and held at each temperature for a period of time sufficient to allow the desired crystal growth.

The filling compositions which are produced by the method of the invention can have solids contents greater than 40%, preferably from 40% to 60%, while maintaining good flow characteristics.

The filling composition can be employed to produce a comestible product comprising an outer shell of a cooked farinaceous material having an inner cavity which is filled with the filling composition. In one embodiment, the filling can be used to fill an extruded outer shell having a generally C-shaped cross-sectional configuration, which can be produced by the procedure described in U.S. Pat. No. 4,613,509. The extruded outer shell can be, for example, a puff-extruded corn meal. Because the filling composition of the invention can be pumped through a nozzle opening less than 0.080 inch in width without clogging, it is particularly well suited for continuously filling the C-shaped extrudate through the narrow slit which forms the open side of the C-shaped cross-section. The filling compositions of this invention may be disposed in such C-shaped shells and will exhibit Brookfield viscosities at 73° F.±2° F., from about 500,000 cps to about 3,000,000 cps, preferably from about 500,000 cps to about 1,000,000 cps, measured with a Brookfield model HBT viscometer using a No. 7 spindle at 2-½ r.p.m. The filling compositions generally have densities from about 0.8 gm/cc to about 1.2 gm/cc.

The following examples are intended to illustrate further the practice of the invention and are not intended to limit its scope in any way. In each of the examples that follow, the solids extender was whey solids and the whey solids and solid flavoring materials had initial particle sizes ranging up to about 850 microns.

EXAMPLE I

A pumpable, edible filling composition was produced from the following ingredients:

| Ingredient | Percent by Weight |
|---|---|
| Vegetable shortening (Wiley melt point 95° F.) | 50% |
| Sweet whey solids | 20% |
| French onion powder | 30% |

The vegetable shortening was heated to a temperature of about 140° F. and charged to a 45-gallon mixing tank, jacketed for heating and cooling, wherein the shortening was cooled between 115° F. and 120° F. The sweet whey solids and French onion powder were charged to the mixing tank and thoroughly dispersed in the melted fat.

From the mixing tank, the shortening was pumped by means of a progressive cavity pump to the inlet port of a six-inch diameter scrape-surface heat exchanger having a 4-½ inch mutator (Cherry-Burrell Model 624DE Thermutator) that used ammonia as the cooling medium. Residence time in the scrape-surface heat exchanger was about 1.5 minutes. The material exited the heat exchanger at a temperature between 55° F. and 65° F.

The material was then passed through a second, six-inch diameter scrape-surface heat exchanger having a 5-½ inch mutator, and which used water as a cooling medium. Residence time in this heat exchanger was about 1.5 minutes. The material exited the heat exchanger at a temperature from 70° F. to 80° F.

The material which was discharged from the second scrape-surface heat exchanger was collected and passed through a 3-roll refiner (Buhler-Miag Model 5DY-300) to reduce the particle size of the solids to between about 60 and 65 microns.

EXAMPLE II

A pumpable, edible filling composition was prepared by the procedure of Example I, except that the vegetable shortening employed had a Wiley melt point of 105° F.

EXAMPLE III

A pumpable, edible filling composition was prepared by the procedure of Example I, except that cheddar and jalapeno seasoning powder was substituted for the French onion powder.

EXAMPLE IV

A pumpable, edible filling composition was prepared by the procedure of Example I, except that cheddar and jalapeno seasoning powder was substituted for the French onion powder and the vegetable shortening employed had a Wiley melt point of 105° F.

EXAMPLE V

A pumpable, edible filling composition was prepared by the procedure of Example I, except that nacho cheese powder was substituted for the French onion powder.

EXAMPLE VI

A pumpable, edible filling composition was prepared by the procedure of Example I, except that nacho cheese powder was substituted for the French onion powder and the vegetable shortening had a Wiley melt point of 105° F.

EXAMPLE VII

Samples of the material exiting the second scrape-surface heat exchanger in each of Examples I-VI were collected and analyzed for density. In each case, material exiting the roll refiner was analyzed for density and particle size. The results are presented in the table below.

TABLE

| Formula | Post Heat Exchanger | | Post Roller Mill | | |
|---|---|---|---|---|---|
| | Temp. °F. | Density gm/cc | Temp. °F. | Density gm/cc | Size microns |
| French Onion - 95° mp (Example I) | 73 | 1.09 | 65 | 0.98 | 60-65 |
| French Onion - 105° mp (Example II) | 78 | 1.15 | 65 | 0.96 | 55-60 |
| Cheddar & Jalapeno - 95° mp (Example III) | 73 | 1.20 | 65 | 1.05 | 60-70 |
| Cheddar & | 77 | 1.22 | 65 | 1.05 | 60-70 |

TABLE-continued

| Formula | Post Heat Exchanger | | Post Roller Mill | | |
|---|---|---|---|---|---|
| | Temp. °F. | Density gm/cc | Temp. °F. | Density gm/cc | Size microns |
| Jalapeno - 105° mp (Example IV) | | | | | |
| Nacho Cheese - 95° mp (Example V) | 77 | 1.09 | 65 | 1.00 | 60–65 |
| Nacho Cheese - 105° mp (Example VI) | 80 | 1.11 | 65 | 1.00 | 60–65 |

EXAMPLE VIII

About 45 pounds of the filling composition described in Example I above were charged into a twin screw pump feeder that forced the filling into a positive displacement pump without causing aeration. The pump transported the filling to a manifold where the filling was divided into multiple flow streams. Each flow stream was carried through two flow control valves and exited through a nozzle orifice that was about 0.080 inch in width. No clogging of any nozzles was observed and each exiting from the nozzle orifice was continuous without interruption.

A filled C-shaped product can be produced by suspending each nozzle in the longitudinal slit of a moving C-shaped extrudate of edible material such that the exiting velocity of the filling causes it to fill the hollow shell cavity.

What is claimed is:

1. A method for producing a pumpable, edible filling composition which comprises:
   (a) heating a vegetable shortening to a temperature at least high enough to dissolve its crystal structure, said vegetable shortening having a Wiley melt point from about 90° F. to about 120° F. and a solid fat index from about 1% to about 6% at 92° F. and at 100° F;
   (b) dispersing a solids extender and a solid flavoring material in the heated vegetable shortening so as to form a dispersion;
   (c) cooling the dispersion to a temperature below the crystallization temperature of the vegetable shortening in a heat exchanger which effects cooling at a rate that is substantially uniform throughout the dispersion; and
   (d) reducing the particle size of the solids extender and solid flavoring material in the dispersion to a size from about 20 microns to about 100 microns.

2. A method as claimed in claim 1 wherein the temperature of said heated vegetable shortening is between about 110° F. and 120° F. when said solids extender and solid flavoring material are dispersed into said shortening.

3. A method as claimed in claim 1 wherein the dispersion comprises from about 40% to about 60% by weight vegetable shortening; from about 10% to about 40% by weight solids extender; and from about 1% to about 50% by weight of solid flavoring material.

4. A method as claimed in claim 1 wherein the dispersion contains about 50 Weight percent vegetable shortening, about 20 weight percent solids extender and about 30 weight percent solid flavoring material.

5. A method as claimed in claim 1 wherein the dispersion contains at least 40% by weight combined solids extender and flavoring material.

6. A method as claimed in claim 1 wherein the solids extender is whey solids.

7. A method as claimed in claim 1 wherein the solids extender and flavoring material are reduced to a particle size from about 40 microns to about 70 microns.

8. A method as claimed in claim 1 wherein the particle size of the solids extender and solid flavoring material is reduced by refining the dispersion.

9. A method as claimed in claim 1 wherein cooling of the dispersion is effected in a scrape-surface heat exchanger.

10. A method as claimed in claim 1 wherein in step (b), the dispersion is at a temperature of between about 110° F. and 120° F., and wherein in step (c), the dispersion of solids extender and solid flavoring material is passed through a first scrape-surface heat exchanger which reduces its temperature to a temperature from about 50° F. to about 70° F. and then through a second scrape-surface heat exchanger to raise its temperature to a temperature from about 70° F. to about 90° F.

11. A method for producing a pumpable edible filling composition which comprises:
   (a) heating a vegetable shortening to a temperature at least high enough to dissolve its crystal structure, said vegetable shortening having a Wiley melt point from about 90° F. to about 120° F. and a solid fat index from about 1% to about 6% at 92° F. and at 100° F.;
   (b) dispersing whey solids and a solid flavoring material in the heated vegetable shortening so as to form a dispersion;
   (c) cooling the dispersion to a temperature below the crystallization temperature of the vegetable shortening in a heat exchanger that effects cooling at a rate which is substantially uniform throughout the dispersion; and
   (d) reducing the particle size of the whey solids and solid flavoring material in the dispersion to a size from about 20 microns to about 100 microns.

* * * * *